Feb. 1, 1949.                    M. B. TAYLOR                    2,460,313
                                 CLUTCH DEVICE
                              Filed Aug. 8, 1945

*INVENTOR.*
MOULTON B. TAYLOR.
BY
Ralph L Chappell
ATTORNEY

Patented Feb. 1, 1949

2,460,313

UNITED STATES PATENT OFFICE 2,460,313

CLUTCH DEVICE

Moulton B. Taylor, United States Navy

Application August 8, 1945, Serial No. 609,702

12 Claims. (Cl. 74—469)

(Granted under the act of March 3, 1883, as amended April 30, 1928; 370 O. G. 757)

This invention relates to new and useful improvements in clutch devices, and more particularly, to clutch devices for use in conjunction with servo-motors and the like.

In many instances involving the translation of electrical energy into reciprocal linear motion, use is made of the servo-motor. This is particularly true in the case of the automatic flight control of planes by radio and other electrical equipment wherein the servo-motor is effectively utilized to translate electrical impulses into linear motion that operates through suitable linkages to actuate the rudder, ailerons, elevators and other controls of the plane. Furthermore, in the case of automatic pilot installations in aircraft, the conventional manual flight control equipment is retained and it is necessary to provide means to change-over from manual to automatic flight control and vice-versa. It is desirable that this change-over be made quickly, and be as simplified an operation as possible.

With the foregoing in mind, the principal object of the present invention is to provide a novel clutch device for servo-motor and like installations which is operable substantially instantaneously to effect engagement and disengagement of the servo-motor with respect to apparatus to be actuated thereby.

Another object of the present invention is to provide a novel clutch device of the type decribed which is of relatively simplified and rugged construction, quick acting in operation, and highly efficient and fool-proof in operation and use.

Figure 1:
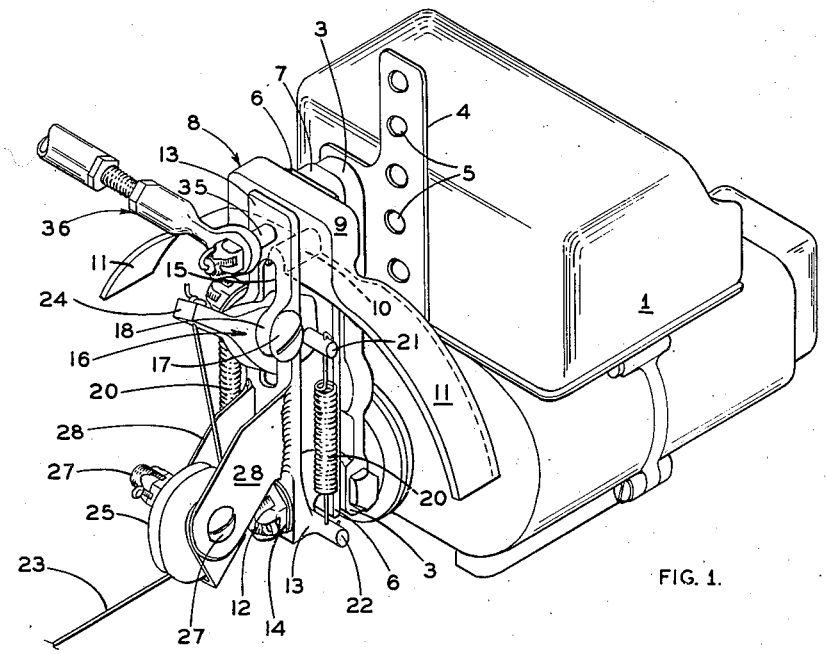
Figure 2:
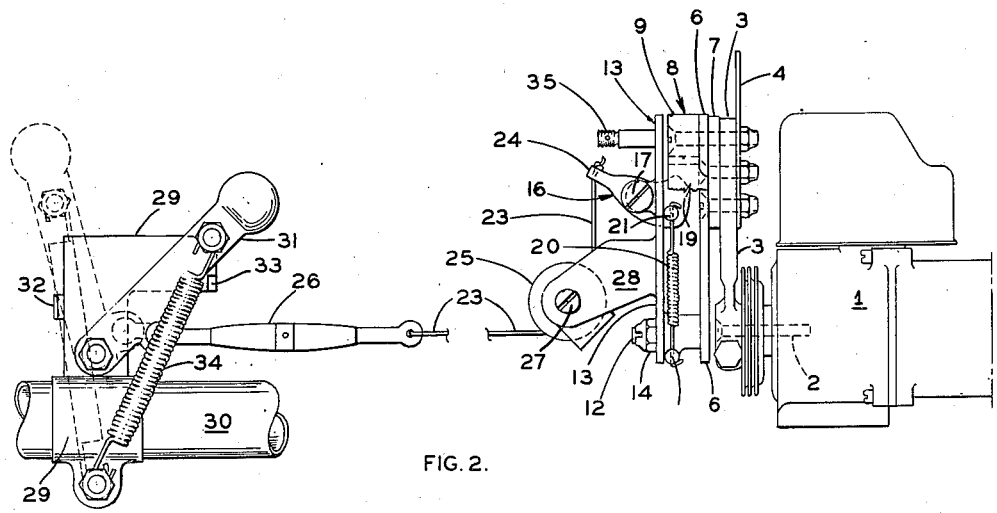

These and other objects of the invention, and the various features and details of the construction and operation thereof, are hereinafter fully set forth and described with reference to the accompanying drawing, in which:

Fig. 1 is a view in perspective of a clutch device embodying the present invention shown in conjunction with a conventional type servo-motor; and Fig. 2 is an elevational view of the servo-motor and clutch assembly together with suitable means for operating the clutch device.

Referring now to the drawing, reference numeral 1 designates generally a conventional type servo-motor having a shaft 2 which is rotatably driven thereby through predetermined increments in either a clockwise or counter-clockwise direction within predetermined limits in either direction from a central position in the manner well known to persons familiar with the construction and operation of servo-motors.

Fixedly secured upon the outer or free end of the servo-motor shaft 2, for rotational movement therewith is a crank assembly comprising, inter alia, a lever 3, a bracket member 6 and a latch receiving and guide member 8. In the illustrated embodiment of the present invention, the lever 3 extends normal to the said shaft 2 and has a length radially with respect to the shaft sufficient to provide a predetermined movement of apparatus that may be operatively connected thereto. For this purpose, there may be secured to the inner face of the lever 3, adjacent the free or outer end thereof, a plate or bracket 4 having a series of openings 5 therein for connection thereto of suitable linkages, cables or the like (not shown) that lead to apparatus and equipment to be actuated by the servo-motor 1 in the usual manner.

The bracket member 6 is secured to the outer face of the lever 3, for movement therewith and this bracket member 6 may be suitably spaced outwardly from the lever 3 by a spacer member 7. The bracket 6 extends parallel to the lever 3 and substantially co-extensively lengthwise thereof, as shown. The latch receiving and guide member 8 of the crank assembly is secured to the upper end of the bracket member 6 for movement therewith and with the lever 3. This latch receiving member 8 comprises a central portion 9 having therein, in alignment with the longitudinal axes of the arm 3 and bracket 6, a recess or slot 10, and extending laterally from opposite sides of the central portion 9 of the member 8 are arcuate guide portions 11, of predetermined length.

Extending outwardly from the lower end of the bracket member 6 in coaxial relation with respect to the servo-motor shaft 2, is a stud 12 on which there is rotatably mounted a radial arm 13 which is retained against displacement from the stud 12 by means of a suitable nut or the like 14. Formed lengthwise in the arm 13 is an elongated slot or opening 15 within which moves a latch member 16 that is pivotally mounted upon a pin 17 that has its opposite end portions supported in suitable ears 18 provided upon the outer face of said arm 13 at respectively opposite sides of the slot or opening 15.

The latch member 16 has an end portion 19 arranged to engage with the recess or slot 10 in the central portion 9 of the member 8 upon pivotal movement of said latch member in the counter-clockwise direction with reference to Fig. 2 of the drawing. The latch member 16 normally is urged in clockwise direction with reference to Fig. 2, and free of engagement with the slot 10, for example, by means of coil springs 20 which are connected between a cross-pin 21 carried by the latch member 16 and suitable laterally projecting portions 22 at the base of the pivoted arm 13. The latch member 16 may be actuated in a counter-clockwise direction about the pin 17 and against the action of the springs 20, for example, by means of a cable 23, one end of which is suitably connected to a portion 24 of the latch member 16 from which said cable 23 leads downwardly and about a sheave or pulley 25 and then to a suitable remote actuating device, to which it may be connected through a turnbuckle or other adjustable device 26. The sheave or pulley 25 is rotatably mounted upon a pin 27 that is secured in the outer end portions of spaced parallel wing portions 28 that extend outwardly from the arm 13 in the relation shown in the drawing.

One form of actuating device is shown in Fig. 2 of the drawing, and may comprise a bracket structure 29 adapted to be mounted upon a suitable fixed support element 30 and having a pivotally mounted handle member 31 to which the turnbuckle 26 is connected. The handle 31 is movable between terminal positions fixed by stops 32 and 33, and a spring 34 is connected between said handle 31 and the fixed bracket structure 29 as shown.

A stud or other suitable connector element 35 is fixed to and carried by the arm 13 for connection to the latter of one end of a suitable linkage system 36 that leads to a remote device or apparatus adapted to be actuated and controlled either automatically by operation of the servo-motor or by manual means as desired, and, it will be apparent from the foregoing description and from the drawing, when the latch member 16 is engaged within the slot 10 of the member 8, the arm 13 will be interlocked with the lever 3 which is driven by the shaft 2 so that both said arm 13 and lever 3 are actuated by the servo-motor 1 to thereby correspondingly actuate the linkage system 36 connected to the arm 13 through the stud 35. On the other hand, when it is no longer desired to actuate the linkage 36 from the servo-motor 1, or when it is desired to independently actuate a device or apparatus controlled by said linkage 36, for example, by manual means, the arm 13 may be disconnected, and rendered free of the driven lever 3. Thus, the arm 13 and its associated linkage 36 may be operatively connected to or disconnected from the servo-motor 1 merely by pulling upon or releasing the cable 23 to engage or disengage the latch 16 from the slot 10 as the case may be.

In the illustrated embodiment of the invention, the cable 23 may be actuated to engage the latch 16 within the slot 10 and operatively connect the arm 13 to the servo-motor 1, by movement of the handle 31 against the action of the springs 20 and of the spring 34, from the solid line position shown in Fig. 2 to the dotted line position thereof. Actuation of the handle 31 into the dotted line position shown carries the spring 34 over the center position of maximum tension exerted by the spring 34 with the result that in this slightly over center position of the handle, the spring 34 will operate to retain the handle 31 in that position. Thus, when it is desired to disengage the arm 13 and its connected linkage from the servo-motor, it is merely necessary to "kick" the handle 31 over the center position of the spring 34 whereupon the latter, and the springs 20 acting on the latch 16, act cooperatively to return the handle 31 to the solid line position with accompanying release of the pull upon the actuating cable 23 thereby permitting said springs 20 to withdraw the latch 16 from the slot 10.

As previously stated, the member 8 includes arcuate guide portions 11 which extend in a lateral direction from opposite sides of the central portion 9 of said member 8. These guide portions 11, together with the under surface of the central portion 9 of the member 8, provide arcuate surfaces that extend in opposite directions from the slot opening 10, and which, when the latch 16 and slot 10 are not properly aligned with one another to permit the latch to enter the slot 10, function to limit movement of the latch member 16 until such time as operation of the servo-motor 1 brings the slot 10 into alignment with said latch member 16 whereupon the latch will be caused to engage the slot 10 by reason of the then unrestrained actuating force exerted thereon by the cable 23. In view of this function of the arcuate guide portions 11, the over-all arcuate length thereof should exceed slightly the over-all arcuate travel of the arm 13 and lever 3 relative to one another.

From the foregoing description, it will be apparent that the present invention provides a novel device which is operable to effect substantially instantaneous engagement and disengagement of a servo-motor or the like, with respect to apparatus adapted to be actuated thereby. The invention also provides a novel device of the stated character which is of relatively simplified and rugged construction, quick acting in operation, and highly efficient and fool-proof in use.

While a particular embodiment of the invention has been illustrated and described herein, it is not intended to limit the invention to such disclosure, and changes and modifications may be made therein and thereto within the scope of the claims.

The invention described herein may be manufactured and used by or for the Government of the United States of America for governmental purposes without the payment of royalties thereon or therefor.

1. A clutch for servo-motors and the like having a shaft adapted to be rotatably driven thereby in opposite directions within the limits of an arc of predetermined length, a crank assembly fixedly mounted on said shaft for rotational movement therewith and extending radially of said shaft, a radial arm rotatably mounted on said crank assembly for rotational movement independently thereof about an axis disposed in coaxial relation with respect to the axis of said shaft, a latch member pivotally carried by said radial arm and arranged when pivoted in one direction to engage a slot in said crank assembly, and spring means directly connected to and normally tending to maintain said latch member free of engagement with said slot.

2. A clutch for servo-motors and the like having a shaft adapted to be rotatably driven thereby in opposite directions within the limits of an arc of predetermined length, a crank assembly fixedly mounted on said shaft for rotational movement therewith and extending radially of said shaft, a radial arm rotatably mounted on said crank assembly for rotational movement independently thereof about an axis disposed in coaxial relation with respect to the axis of said shaft, a latch member pivotally carried by said radial arm and arranged when pivoted in one direction to engage a slot in said crank assembly and prevent relative rotation of said arm with respect to said crank assembly, spring means directly connected to and normally tending to maintain said latch member free of engagement with said slot, and means to actuate said latch member into engagement with said slot against said spring means.

3. A clutch for servo-motors and the like having a shaft adapted to be rotatably driven thereby in opposite directions within the limits of an arc of predetermined length, a crank assembly fixedly mounted on said shaft for rotational movement therewith and extending radially of said shaft, a radial arm rotatably mounted on said crank assembly for rotational movement independently thereof about an axis disposed in coaxial relation with respect to the axis of said shaft, a latch member pivotally carried by said arm and arranged when pivoted in one direction to engage a slot in said crank assembly and prevent relative rotation of said arm with respect to said crank assembly and arcuate guide means associated with said crank assembly extending in opposite directions from the slot therein and operable to restrain and limit pivotal movement of the latch member in one said direction until said slot and latch member are aligned.

4. A clutch for servo-motors and the like having a shaft adapted to be rotatably driven thereby in opposite directions within the limits of an arc of predetermined length, a crank assembly fixedly mounted on said shaft for rotational movement therewith and extending radially of said shaft, a radial arm rotatably mounted on said crank assembly for rotational movement independently thereof about an axis disposed in coaxial relation with respect to the axis of said shaft, a latch member pivotally carried by said arm and arranged when pivoted in one direction to engage a slot in said crank assembly and prevent relative rotation of said arm with respect to said crank assembly, and arcuate guide means associate with said crank assembly extending in opposite directions from the slot therein and operable to restrain and limit pivotal movement of the latch member in said one direction until said slot and latch member are aligned, and spring means directly connected to and normally tending to maintain said latch member free of engagement with said slot and guide means.

5. A clutch for servo-motors and the like having a shaft adapted to be rotatably driven thereby in opposite directions within the limits of an arc of predetermined length, a crank assembly fixedly mounted on said shaft for rotational movement therewith and extending radially of said shaft, a radial arm rotatably mounted on said crank assembly for rotational movement independently thereof about an axis disposed in coaxial relation with respect to the axis of said shaft, a latch member pivotally carried by said arm and arranged when pivoted in one direction to engage a slot in said crank assembly and prevent relative rotation of said arm with respect to said crank assembly, and arcuate guide means associate with said crank assembly extending in opposite directions from the slot therein and operable to restrain and limit pivotal movement of the latch member in said one direction until said slot and latch member are aligned, and spring means directly connected to and normally operable to maintain said latch member free of engagement with said slot and guide means, and means to actuate said latch member into engagement with said slot against said spring means.

6. A clutch for servo-motors and the like having a shaft rotatably driven thereby in opposite directions within the limits of an arc of predetermined length, a lever fixedly mounted on said shaft for movement therewith and extending radially outward from said shaft, a bracket secured to the outer end of said lever and extending parallel thereto in a radially inward direction with respect to said shaft, a member having a slot therein and secured to and carried by said bracket at the radially outer end thereof, a radial arm rotatably mounted on said bracket at the inner end thereof for rotational movement with respect thereto about an axis disposed in coaxial relation with respect to the shaft, and latch means carried by said arm and arranged to engage the slot in said member when the bracket and said arm are correspondingly positioned rotationally to align said slot and latch means.

7. A clutch for servo-motors and the like having a shaft rotatably driven thereby in opposite directions within the limits of an arc of predetermined length, a lever fixedly mounted on said shaft for movement therewith and extending radially outward from said shaft, a bracket secured to the outer end of said lever and extending parallel thereto in a radially inward direction with respect to said shaft, a member having a slot therein and secured to and carried by said bracket at the radially outer end thereof, a radial arm rotatably mounted on said bracket at the inner end thereof for rotational movement with respect thereto about an axis disposed in coaxial relation with respect to the shaft, a latch member pivotally carried by said arm and arranged when pivoted in one direction to engage the slot in said member when the bracket and said arm are correspondingly positioned rotationally to align said slot and latch member, and arcuate guide means associated with said member and extending from opposite sides of the slot therein circumferentially of said shaft to restrain and limit pivotal movement of the latch member until said slot and latch member are aligned.

8. A clutch for servo-motors and the like having a shaft rotatably driven thereby in opposite directions within the limits of an arc of predetermined length, a lever fixedly mounted on said shaft for movement therewith and extending radially outward from said shaft, a bracket secured to the outer end of said lever and extending parallel thereto in a radially inward direction with respect to said shaft, a member having a slot therein and secured to and carried by said bracket at the radially outer end thereof, a radial arm rotatably mounted on said bracket at the inner end thereof for rotational movement with respect thereto about an axis disposed in coaxial relation with respect to the shaft, a latch member pivotally carried by said arm and arranged when pivoted in one direction to engage the slot in said member when the bracket and said arm are correspondingly positioned rotationally to align said slot and latch member, spring means normally urging the latch member in the opposite direction free of engagement with said slot, and means to actuate said latch member in said one direction against the action of said spring means.

9. A clutch for servo-motors and the like having a shaft rotatably driven thereby in opposite directions within the limits of an arc of predetermined length, a lever fixedly mounted on said shaft for movement therewith and extending radially outward from said shaft, a bracket secured to the outer end of said lever and extending parallel thereto in a radially inward direction with respect to said shaft, a member having a slot therein and secured to and carried by said bracket at the radially outer end thereof, a radial arm rotatably mounted on said bracket at the inner end thereof for rotational movement with respect thereto about an axis disposed in coaxial relation with respect to the shaft, a latch member pivotally carried by said arm and arranged when pivoted in one direction to engage the slot in said member when the bracket and said arm are correspondingly positioned rotationally to align said slot and latch member, arcuate guide means associate with said member and extending from opposite sides of the slot therein circumferentially with respect to said shaft to restrain and limit pivotal movement of the latch member until said slot and latch member are aligned, and means to actuate said latch member in said one direction against the action of said spring means.

10. A clutch for servo-motors and the like having a shaft rotatably driven thereby in opposite directions within the limits of an arc of predetermined length, a lever fixedly mounted on said shaft for movement therewith and extending radially outward from said shaft, a bracket secured to the outer end of said lever and extending parallel thereto in a radially inward direction with respect to said shaft, a member having a slot therein and secured to and carried by said bracket at the radially outer end thereof, a radial arm rotatably mounted on said bracket at the inner end thereof for rotational movement with respect thereto about an axis disposed in coaxial relation with respect to the shaft, a latch member pivotally carried by said arm and arranged when pivoted in one direction to engage the slot in said member when the bracket and said arm are correspondingly positioned rotationally to align said slot and latch member, arcuate guide means associated with said member and extending from opposite sides of the slot therein circumferentially with respect to said shaft to restrain and limit pivotal movement of the latch member until said slot and latch member are aligned, and spring means normally urging the latch member in the opposite direction free of engagement with said slot.

11. A clutch for servo-motors and the like having a shaft rotatably driven thereby in opposite directions within the limits of an arc of predetermined length, a lever fixedly mounted on said shaft for movement therewith and extending radially outward from said shaft, a bracket secured to the outer end of said lever and extending parallel thereto in a radially inward direction with respect to said shaft, a member having a slot therein and secured to and carried by said bracket at the radially outer end thereof, a radial arm rotatably mounted on said bracket at the inner end thereof for rotational movement with respect thereto about an axis disposed in coaxial relation with respect to the shaft, a latch member pivotally carried by said arm and arranged when pivoted in one direction to engage the slot in said member when the bracket and said arm are correspondingly positioned rotationally to align said slot and latch member, arcuate guide means associated with said member and extending from opposite sides of the slot therein circumferentially with respect to said shaft to restrain and limit pivotal movement of the latch member until said slot and latch member are aligned, spring means normally urging the latch member in the opposite direction free of engagement with said slot, and means to actuate said latch member in said one direction against the action of said spring means.

12. A clutch for servo-motors and the like having a shaft rotatably driven thereby in opposite directions within the limits of an arc of predetermined length, a lever fixedly mounted on said shaft for movement therewith and extending radially outward from said shaft, a bracket secured to the outer end of said lever and extending parallel thereto in a radially inward direction with respect to said shaft, a member secured to and carried by said bracket member at the radially outer end thereof, said member having therein an inwardly opening slot disposed in the plane containing the axes of said lever and said shaft and including arcuate guide portions of predetermined length extending from opposite sides of said slot circumferentially with respect to the axis of said shaft, a radial arm rotatably mounted on said bracket at the inner end thereof for rotational movement with respect thereto about an axis disposed in coaxial relation with respect to the shaft, a latch member pivotally carried by said arm and arranged when pivoted in one direction to engage the slot in said member when the bracket and said arm are correspondingly positioned rotationally to align said slot and latch member, the said arcuate guide portions of the said member operating to restrain and limit pivotal movement of the latch member until said slot and latch member are aligned, spring means normally urging the latch member in the opposite direction free of engagement with said slot, and means to actuate said latch member in said one direction against the action of said spring means.

MOULTON B. TAYLOR.

REFERENCES CITED

The following references are of record in the file of this patent:

UNITED STATES PATENTS

| Number | Name | Date |
| --- | --- | --- |
| 2,161,732 | Manteuffel | June 6, 1939 |
| 2,167,421 | Jann et al. | July 25, 1939 |
| 2,237,719 | Tiebel | Apr. 8, 1941 |